Oct. 12, 1937.                G. SUNDBACK                 2,095,458
         METHOD OF MANUFACTURING SEPARABLE INTERLOCKING FASTENERS
                          Filed July 10, 1933
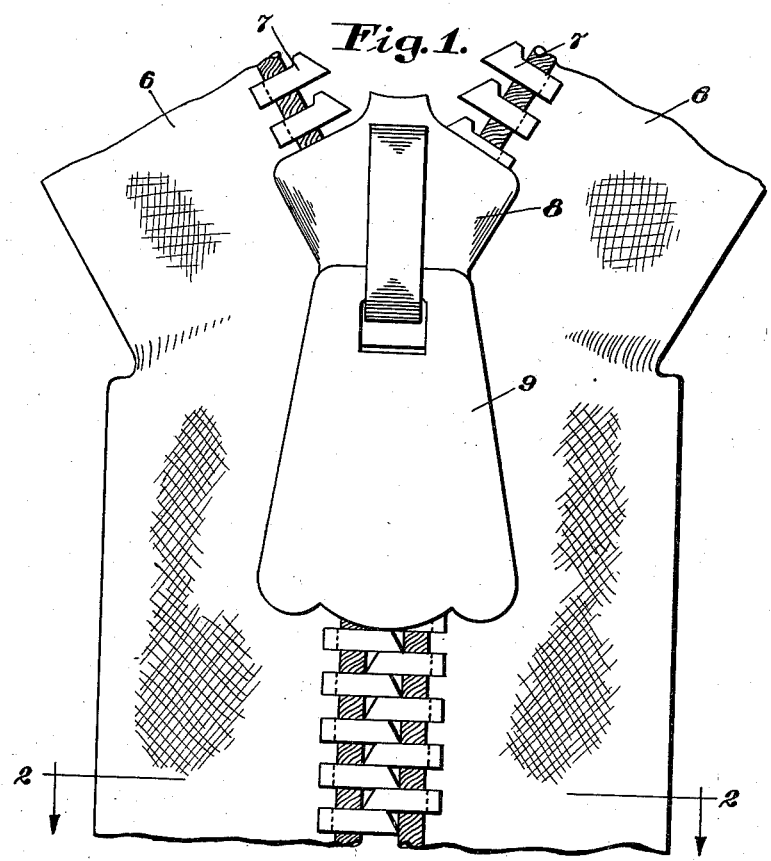
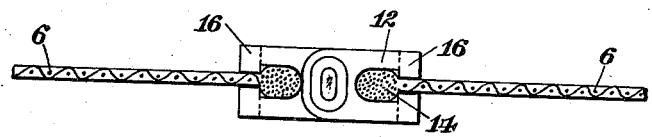
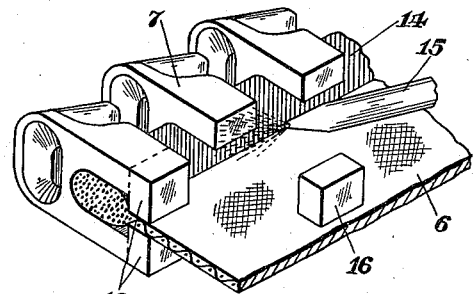
INVENTOR.
Gideon Sundback
BY Kelley & Chisholm
ATTORNEYS.

Patented Oct. 12, 1937

2,095,458

UNITED STATES PATENT OFFICE 2,095,458

METHOD OF MANUFACTURING SEPARABLE INTERLOCKING FASTENERS

Gideon Sundback, Meadville, Pa., assignor to Hookless Fastener Company, Meadville, Pa., a corporation of Pennsylvania Application July 10, 1933, Serial No. 679,691

5 Claims. (Cl. 18—59)

This invention relates to separable interlocking fasteners and particularly to the attachment of fastener members to flexible supports.

It has been proposed to make separable interlocking fasteners with fastener members of non-metallic material. Separable interlocking fasteners now on the market are known as slide fasteners and made from metal. Some advantages of non-metallic materials over metal in fasteners of this type are lightness in weight, appearance including color variations to match the article being fastened, and smoothness.

The fastener members can readily be formed from non-metallic materials by methods which have now become known and my present invention deals particularly with the attachment of the members to the fabric tape after they have been formed. Specifically the invention provides means in the form of lugs or cleats to lock the formed fastener member in position on flexible supports.

In the accompanying drawing I have shown for purposes of illustration one embodiment which my invention may assume in practice. In the drawing:

Fig. 1 is a general view of a fastener of the class described;

Fig. 2 is a cross-section through the fastener on line 2—2 of Fig. 1;

Fig. 3 is a perspective view illustrating the method of attachment of the members to the flexible support; and Fig. 4 is a perspective view of the fastener members before attachment.

The fastener members are preferably made of a non-metallic material which can be rendered plastic by means of heat or a solvent. However, non-metallic materials which are insoluble may be employed if cements are used to stick on the attaching lugs. One example of a material which is believed to be preferable is pyroxylin. This can be readily softened by means of a solvent such as acetone.

The fastener may assume various forms and the one illustrated comprises a pair of fabric tapes 6 having fastener members 7 attached thereto in uniformly spaced relation. The fastener members are brought into engagement or separated by moving the slider with a pull tab 9.

The form of fastener member as shown comprises an interlocking head having a projection 10 and a recess 11; and attaching means comprising a U-shaped portion providing arms 12 and a slot 13.

Referring to Fig. 3, the beaded edge 14 of the tape 6 is inserted in the slot 13 of the U-shaped portions. At this time the ends of the arms 12 may be sprayed through a nozzle 15, with a suitable solvent. Then the lugs 15 (or cleats) are put in place against the ends of the fastener members.

The solvent may also be applied to the fabric tape adjacent the fastener members and the lugs 16 being of soluble material will adhere to the tape firmly. Instead of using a spray 15, the lugs 16 may be wet with solvent or heated to cause them to adhere to the fastener members and tape.

The term "sticking" as used herein and in the appended claims means attaching the contacting surfaces together by softening the material of the contacting members by the use of heat or solvent sufficiently to cause them to adhere together, or by the use of a suitable cement.

While I have shown and described in this application one embodiment which my invention may assume in practice, it will be understood that this embodiment is only for the purposes of illustration and that various other forms may occur to those skilled in the art as shown in the appended claims.

What I claim as my invention is:

1. In the manufacture of separable interlocking fasteners, forming fastener members from non-metallic material each with an interlocking head, and a U-shaped portion, placing said U-shaped portion astride the beaded edge of a tape, and attaching anchor lugs to the ends of said U-shaped portions by sticking, said anchor lugs engaging behind the beaded edge of said tape.

2. In the manufacture of separable interlocking fasteners, forming fastener members from soluble non-metallic material each with an interlocking head and a U-shaped portion, placing said U-shaped portion astride the beaded edge of a tape, and attaching anchor lugs to said U-shaped portion and to said tape by sticking the contacting surfaces of said anchor lugs, U-shaped portion and tape together.

3. In the manufacture of separable interlocking fasteners of the class described, the method which comprises inserting the edge of a tape in the slots of a series of non-metallic fastener members, and attaching anchor lugs to said fastener members and tape adjacent said slots to hold the fastener members in position on said tape.

4. In the manufacture of separable interlocking fasteners of the class described, the method which comprises forming fastener members from non-metallic material, each with an interlocking head and a U-shaped attaching portion, inserting the edge of a flexible tape in the slots of the U-shaped portions, and sticking to the ends of said U-shaped portions and to said tape anchor lugs for holding the fastener members on said tape.

5. In the manufacture of separable interlocking fasteners of the class described, the method which comprises forming from non-metallic material, portions of interlocking elements which have a projection on one side and a recess on the other side, placing such portions in appropriate positions in proximity to a flexible tape, and attaching said portions in such positions to said tape indirectly by sticking to said portions and to said tape anchor lugs which are adapted to contact both said portions and said tape.

GIDEON SUNDBACK.